O. W. GREENE.
CLUTCH MECHANISM.
APPLICATION FILED JAN. 22, 1919.

1,392,936. Patented Oct. 11, 1921.

OTTO W. GREENE
INVENTOR

BY Richey + Adams.

HIS ATTORNEYS

UNITED STATES PATENT OFFICE.

OTTO W. GREENE, OF ELYRIA, OHIO, ASSIGNOR TO THE GREENE AERONAUTICAL COMPANY, OF ELYRIA, OHIO, A CORPORATION OF OHIO.

CLUTCH MECHANISM.

1,392,936. Specification of Letters Patent. Patented Oct. 11, 1921.

Application filed January 22, 1919. Serial No. 272,427.

*To all whom it may concern:*

Be it known that I, OTTO W. GREENE, a citizen of the United States, residing at Elyria, in the county of Lorain and State of Ohio, have invented certain new and useful Improvements in Clutch Mechanisms; and I do hereby declare the following to be a full, clear, and exact description of the invention, such as will enable others skilled in the art to which it appertains to make and use the same.

One of the objects of my invention is to produce a clutch mechanism which is simple, easy and cheap to make, install and operate, and which is very effective in performing its functions.

I also aim to produce a clutch mechanism which is condensed and offers no protruding parts, and is of great power per unit weight.

I also aim to produce a clutch mechanism whose parts are durable, and which can be readily supplied if eventually worn out or broken.

These and other objects of my invention, as well as the invention itself will be understood from a description of an embodiment of the invention.

Figure 1:
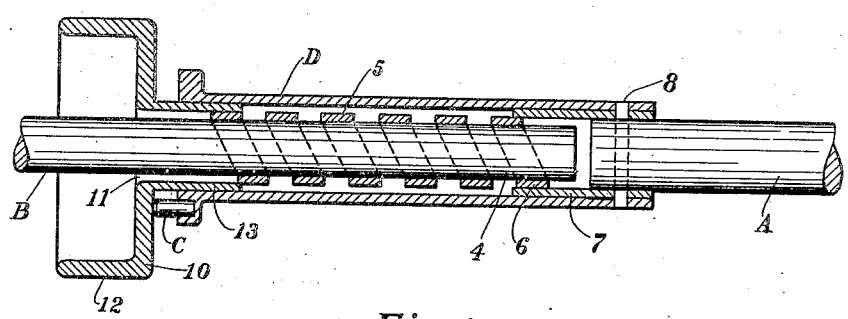
Figure 1 is a longitudinal sectional view of the preferred embodiment of the invention.
Figure 2:
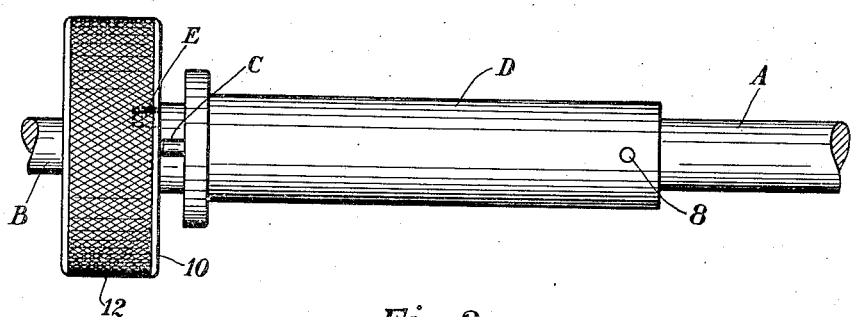
Fig. 2 is a side elevation of the embodiment of the invention shown in Fig. 1.

Referring now to the drawings and to the embodiment of the invention shown therein, at A is shown the driven member and at B is shown the driving member. The driving member is preferably provided with a cylindrical end 4. An expansible, cylindrical member, such as a coil spring 5, is connected at one end to the driven member A by any suitable means. In this embodiment, the end coil 6 thereof is fastened to a sleeve 7 in any suitable manner, such as by brazing, and the sleeve 7 is fastened to the member A, as here illustrated, by a key 8, which passes through the sleeve 7 and the member A.

In the embodiment shown the coil spring is made of flat spring material, adapted to be expanded or to contract to release or grip the end 4 of the driving member, as illustrated. Means are provided whereby the spring may thus be expanded and permitted to contract, which is here shown as a collar 10 provided with a sleeve 13 and a bore 11, through which the member B extends. The collar is best knurled, as shown at 12, and the free end of the spring connected to the sleeve 13 in any suitable manner, as by brazing these parts together.

Apparatus is provided for maintaining the spring in unclutched position when it has been moved thereto, which here consists of a pin C placed in the end of a sleeve D which is connected at one end by the key 8 to the shaft A, and which rotates therewith. A slot or hole E is formed in the collar 10 into which the pin C slips when the clutch is in released position.

Figure 3:
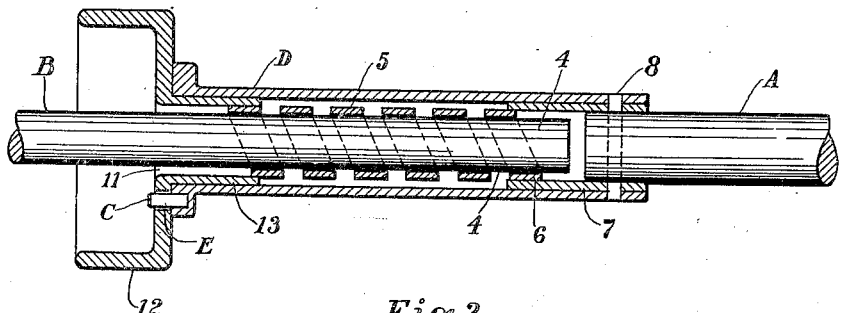
Fig. 3 is a longitudinal sectional view showing the parts in released position.

The operation of this embodiment of my invention is as follows: Assuming the parts to be in the position shown in Fig. 3, the pin C is in the slot E and the spring 5 has been unwound sufficiently to be expanded and out of engagement with the driving shaft B. In this position the clutch is released. When it is desired to throw the clutch into operation, the collar 12 is caught by the hand and moved to the left, so that the end of the pin C clears the mouth of the slot E. The collar then rotates under the tension of the spring in the winding-up direction, so to speak, which contracts the spirals sufficiently to grip the rotating rod B. The two parts are clutched together, and power will be transmitted to shaft A without material slippage, even though the clutch be overloaded to such an extent as to nearly fracture the spring. Since the spring 5 is made of steel having high tensile strength, it will be evident that the clutch possesses great capacity for power transmission, without sacrificing simplicity of design and manufacture.

To release the clutch, the rotating collar 12 is lightly gripped, and the drag immediately releases the clutch by unwinding and expanding the spring. In the expanded position the pin C registers with the slot E, into which it is snapped by the axial tension of the spring. The end 4 of the shaft B is then released from the driven shaft B, and it then rotates independently of the rest of the apparatus shown in the drawing.

The sleeve 8 also serves as a cover for the spring, but it is not an essential element of the combination, except as a means for holding the collar in unclutched position in the embodiment shown.

The ends of the spring may be attached to the collars and shafts in any suitable manner. A spring of flat material has the great advantage of furnishing a greater surface for engaging the member 4, and this surface can be increased by winding the coils close together. In most cases of commercial use but a slight twisting of the spring is sufficient to realize the gripping and release effects.

The size of the collar 12 may be greatly varied, and in some instances, may be but slightly larger than the part 4 of the shaft B, thereby condensing the apparatus.

While I have described certain parts of the clutch as driving and driven members, this by way of example, it will be apparent that their relation or position may be reversed.

I have illustrated this particular embodiment of my invention and the details thereof for the purpose of better description, but it will be apparent to those skilled in the art that departures may be made from the embodiment illustrated and the details thereof without departing from the spirit of my invention.

I claim:

1. In a clutch mechanism, the combination of a driving member having a cylindrical end, a driven shaft, a flat coiled spring capable of expanding radially connected at one end to said driven shaft and surrounding the cylindrical end of said driving shaft and normally contracted radially to grip the driving shaft to cause the driven member to rotate with the driving member, a knurled collar surrounding the driving shaft connected to the free end of the spring and adapted to be operated to cause twisting and radial expansion of the spring to cause the spring to release the driving shaft, and means including a pin on said driven member and a slot and shoulder therefor for maintaining said spring contracted or expanded, as desired.

2. In a clutch mechanism, the combination of a driving shaft and a driven shaft, a flat coiled spring surrounding the end of one of said shafts, an internal sleeve connected at one end to the other shaft and fastened at the other end about and to the end of the spring, an external sleeve surrounding said internal sleeve, the end of the shaft to which it is attached and the spring, a collar about the other shaft having a boss extending inside one end of the external sleeve, said boss having a bore through which said other shaft extends, and within which the other end of the spring is attached, a pin on the end of said external sleeve, and an opening in said collar for said pin.

In witness whereof, I have hereunto set my hand this 20 day of January, 1919.

OTTO W. GREENE.